United States Patent [19]

Kashio

[11] 3,950,761

[45] Apr. 13, 1976

[54] INK PRESSURIZING APPARATUS FOR AN INK JET RECORDER

[75] Inventor: Toshio Kashio, Yamato, Japan

[73] Assignee: Casio Computer Co., Ltd., Tokyo, Japan

[22] Filed: July 19, 1974

[21] Appl. No.: 490,026

Related U.S. Application Data

[63] Continuation of Ser. No. 320,953, Jan. 4, 1973, abandoned.

[52] U.S. Cl. ................ 346/140 R; 346/75; 417/413

[51] Int. Cl.[2] ........................................ G01D 15/18

[58] Field of Search ............... 346/140, 75; 417/413

[56] References Cited

UNITED STATES PATENTS

| | | | |
|---|---|---|---|
| 2,898,860 | 8/1959 | Grober | 417/413 |
| 3,169,821 | 2/1965 | Miller | 346/140 |
| 3,296,624 | 1/1967 | Ascoli | 346/140 |
| 3,335,424 | 8/1967 | Hartai | 346/140 |
| 3,341,860 | 9/1967 | Schweitzer | 346/140 |

*Primary Examiner*—Joseph W. Hartary
*Attorney, Agent, or Firm*—Flynn & Frishauf

[57] ABSTRACT

An ink pressurizing apparatus for an ink jet recorder comprising an ink storage having an ink inlet port through which to conduct ink from an ink tank to said storage and an ink outlet port through which to deliver ink to a nozzle for ejecting the ink in fine particles and partly formed of elastic material; a plunger mechanism for depressing the elastic material to apply pressure to the ink held in the ink storage; and a valve for preventing the back flow of ink from the ink inlet port to the ink tank.

9 Claims, 2 Drawing Figures

INK PRESSURIZING APPARATUS FOR AN INK JET RECORDER

This is a continuation of application Ser. No. 320,953, filed Jan. 4, 1973 now abandoned.

BACKGROUND OF THE INVENTION

This invention relates to an ink pressurizing apparatus for an ink jet recorder wherein means for applying static pressure to the ink held in an ink storage partly formed of elastic material consists of a plunger mechanism for pressing said elastic material from the outside of said ink storage.

An ink jet recorder is customarily provided with a separate apparatus or mechanism for ejecting ink in fine particles under a constant pressure from the tip of a nozzle of the recorder so as to effect printing, using an electrostatic, electromagnetic or supersonic wave force in pressurizing the ink. A requisite condition for good printing is to deliver ink to the nozzle tip with a uniform pressure. To this end, there is generally used a rotary pump whose operating capacity can be minutely adjusted. Other ink-feeding means include a pump made of elastic material. However, such means is of complicated construction and becomes unavoidably bulky, and moreover is primarily intended to conduct ink throughout its passageway under pressure, instead of pressurizing ink particularly at the nozzle tip as in the present invention.

It is therefore the object of this invention to provide a compact ink pressurizing apparatus of simple construction for an ink jet recorder, which has eliminated the problems raised with the complicated and minute structure of the prior art ink pressurizing apparatus and is most adapted to deliver ink to the nozzle tip with a small uniform pressure. However, the prior art ink jet recorder has the drawbacks that the separate apparatus or mechanism for pressurizing the ink is driven with a force obtained by converting the rotating moment of a motor to a linear motion, or by providing a solenoid near the nozzle, thus rendering the recorder as a whole very bulky, presenting difficulties in controlling the pressure applied to the ink and eventually resulting in the high cost of the recorder.

It is accordingly the object of this invention to provide an ink pressurizing apparatus of simple, compact construction which is free from the aforesaid drawbacks and most adapted to apply static pressure to the ink toward the tip of a nozzle.

SUMMARY OF THE INVENTION

To attain the above-mentioned object, the present invention is characterized in that the bottom portion of an ink storage is made of elastic material and the movable rod of a plunger mechanism is pressed against said bottom portion to pressurize the ink held in the storage, thereby conducting the ink to the tip of a nozzle under pressure. According to the invention, application of pressure to the ink is carried out by a plunger mechanism driven manually or by an electromagnetic force in place of an electric motor used in the conventional ink jet recorder. This arrangement simplifies the construction of a recorder as a whole and permits application of an optimum degree of pressure to the ink held in a storage for the delivery of said ink to the nozzle. Further, the nozzle has a fully smaller diameter than the upper ink inlet port of said storage, so that the present invention makes it possible to eliminate the valve which has generally been provided at the ink outlet port of the conventional ink pressurizing apparatus having a plunger mechanism through which to conduct ink to the nozzle, in order to prevent the back flow of the ink, thereby simplifying the construction of an ink jet recorder.

DETAILED DESCRIPTION OF THE INVENTION

Figure 1:
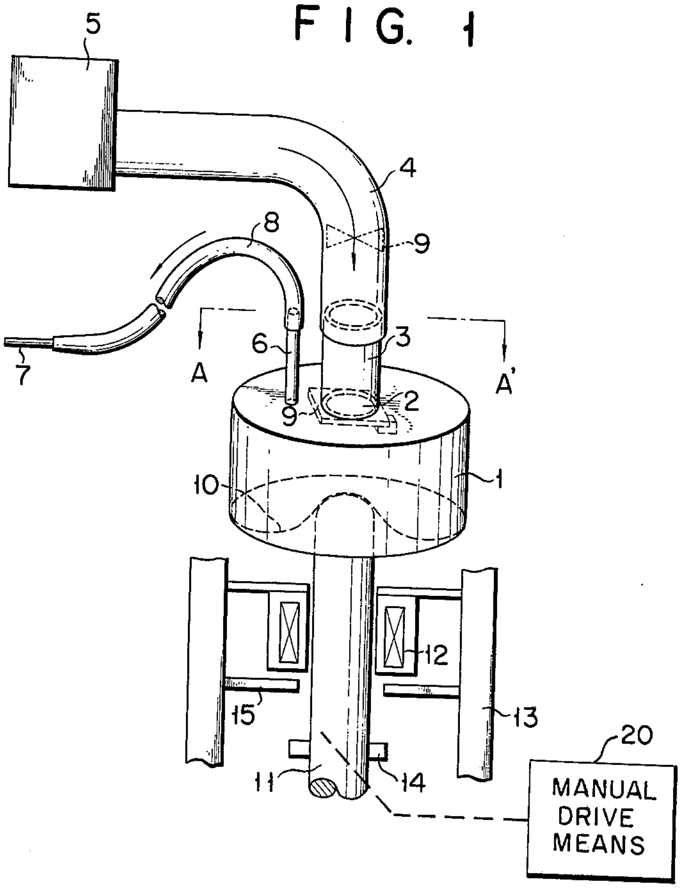
FIG. 1 presents the arrangement of the main part of an ink pressurizing apparatus embodying this invention.

There will now be described an embodiment of this invention by reference to the appended drawings. Referring to FIG. 1, reference numeral 1 denotes an ink storage, the upper wall of which is bored with an ink inlet port 2. To said ink inlet port 2 is connected an ink supply pipe 4 through a connection pipe 3. At the end of said ink supply pump 4 is provided an ink tank 5. To the upper wall of the ink storage 1 is fitted another connection pipe 6 near the first-mentioned connection pipe 3. To a nozzle 7 is connected an ink delivery pipe 8 through said connection pipe 6. Since the nozzle has a very small inner diameter, this connection pipe 6 may have a much smaller inner diameter than the first-mentioned connection pipe 3, thereby eliminating the necessity of particularly providing a valve at the open end of said smaller connection pipe 6 so as to prevent the back flow of ink. On the other hand, that end of the larger connection pipe 3 at which it is fitted to the ink storage 1, namely, the ink inlet port 2 of the ink storage 1 is provided with a valve 9 for preventing the back flow of ink, said valve 9 being opened only when ink is conducted from the ink tank 5 to the ink storage 1. Said back flow preventing valve 9 may be disposed, as shown in FIG. 1, anywhere in the ink supply pipe 4. Over the bottom portion of the ink storage 1 is stretched an elastic member 10 made of, for example, rubber. The movable rod 11 of a plunger mechanism is so positioned as to depress substantially the central part of the outer wall of said elastic member 10. All around the inner wall of a support member 13 is fitted a solenoid 12. The movable rod 11 of the plunger mechanism has a stop 14 and the support member has a rest 15 for catching said stop 14.

There will now be described the operation of an ink pressurizing apparatus arranged as described above according to this invention. Normally, the ink tank 5 is positioned above the nozzle 7. When the movable rod 11 of the plunger mechanism returns to the position shown in solid lines in FIGS. 1 and 2, the back flow preventing valve 9 is opened to introduce ink from the ink tank 5 to the ink storage 1. When the ink held in the storage 1 is delivered to the nozzle 7 for printing, the solenoid 12 is excited to lift the movable rod 11 to cause the upper end of the rod 11 to abut against the outer wall of the elastic member 10, thereby applying pressure to the ink held in the storage 1. As a result, the elastic member 10 is depressed to the position indicated in a dotted line, enabling the ink at the nozzle tip to present a proper meniscus against the inner wall of the nozzle. When the ink now brought to the nozzle tip is to be pressurized, the back flow preventing valve 9 is closed to prevent the ink from being conducted backward to the ink supply pipe 4. Static pressure resulting from the contraction of the elastic member 10 is applied substantially at a constant rate to the nozzle due to the shrinkable nature of said elastic member 10, because an extremely minute amount of ink is ejected from the nozzle.

The force of lifting the movable rod 11 derived from the excitation of the solenoid 12 is controlled by the joint action of the stop 14 and rest 15, thereby limiting the magnitude of pressure applied to the elastic member 10. If said pressure control is effected by fixing the amount of current flowing through the solenoid 12, the stop 14 and rest 15 may be omitted.

Figure 2:
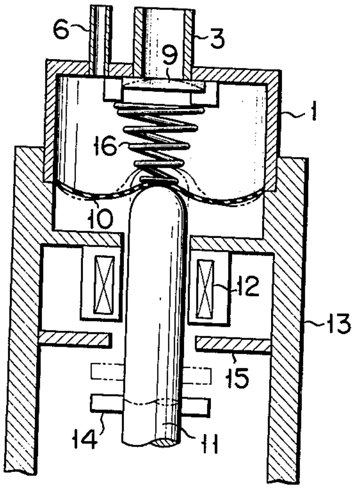
FIG. 2 is a cross sectional view of FIG. 1 as viewed in the direction of the indicated arrows A and A'.

The foregoing description relates to the case where the movable rod 11 of the plunger mechanism was operated by an electromagnetic force obtained by excitation of the solenoid 12. Obviously, however, the operation of said movable rod 11 may be effected manually (i.e., by optional drive means 20) or with a force obtained by converting the rotating moment of an electric motor to a linear motion in place of said electromagnetic force. Further, the ink storage 1 contains a compression spring 16 for enabling the depressed elastic material 10 quickly to regain its original form. As shown in FIG. 2, the diameter of the spring 16 where it bears on the rod 11 through the elastic member 10 is smaller than that of the rod 11.

What is claimed is:

1. In an ink pressurizing apparatus for an ink jet recorder wherein ink is supplied in a predetermined amount under a substantially uniform pressure from an ink tank to a fine nozzle thereby forming a meniscus at the tip of the nozzle, the ink being ejected in fine particles by the electrostatic attraction caused by a high voltage impressed on an electrode provided in front of said nozzle, whereby a desired printing is effected on the recording medium, the improvement comprising:

an ink storage means arranged between the ink tank and the nozzle, said ink storage means including:

an ink inlet port coupled to the ink tank and through which ink is sucked from the ink tank;

an ink outlet port coupled to the nozzle and through which ink is supplied to the nozzle; and an elastic member defining a bottom of a chamber in the ink storage means, the chamber being in communication with the ink inlet and outlet ports;

a plunger mechanism including a movable rod bearing on said elastic member and deforming same to form an inwardly extending substantially central portion thereof which extends toward the interior of said chamber and an outwardly extending portion around the central portion, said rod being operable for depressing the substantially central portion of said elastic member a small further distance in a direction toward the interior of said chamber, whereby the pressure on the ink is increased to further outwardly displace the outwardly extending portion so as to displace through said outlet port an amount of ink which is very small as compared to the ink capacity of the chamber, to thereby build up said substantially uniform pressure by the sucking in of ink from the ink tank due to recovering force of said elastic member, said pressure being sufficient to maintain the meniscus of ink at the nozzle tip but being insufficient to actually pump a flow of ink out of and through said nozzle;

a valve in communication with the ink flow between the ink tank and the ink storage means for preventing ink from flowing back into the ink tank when said elastic member is depressed; and a spring mounted within the ink storage means and bearing directly on said movable rod via said elastic member interposed therebetween, said spring being depressed jointly with said elastic member by said plunger mechanism for quickly pushing back said elastic member to its rest state when the plunger mechanism ceases to depress said elastic member, said spring having a diameter smaller than that of said movable rod where said spring bears on said movable rod.

2. Apparatus according to claim 1 comprising stopper means for preventing said movable rod of said plunger mechanism from moving more than a predetermined distance, thereby controlling the degree of depression of said elastic member and controlling the pressure on the ink.

3. Apparatus according to claim 2 wherein said movable rod of said plunger mechanism is manually driven.

4. Apparatus according to claim 1 wherein said plunger mechanism includes a manually driven movable rod.

5. Apparatus according to claim 1 wherein said valve is provided at said ink inlet port.

6. Apparatus according to claim 1 wherein said valve is interior of the chamber formed in said ink storage means and is in communication with the ink inlet port.

7. Apparatus according to claim 1 wherein said valve is disposed between the ink tank and the inlet port of the ink storage means.

8. Apparatus according to claim 1 wherein said plunger mechanism includes electromagnetically operating means.

9. Apparatus according to claim 1 wherein the outlet port of the ink storage means has a smaller diameter than the inlet port thereof.

* * * * *